US008537538B2

(12) United States Patent
Kannler et al.

(10) Patent No.: US 8,537,538 B2
(45) Date of Patent: Sep. 17, 2013

(54) COMPUTER CASES AND COMPUTERS

(75) Inventors: Bernhard Kannler, Augsburg (DE);
Michael Schmid, Dillingen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 320 days.

(21) Appl. No.: 12/895,949

(22) Filed: Oct. 1, 2010

(65) Prior Publication Data

US 2011/0080706 A1    Apr. 7, 2011

(30) Foreign Application Priority Data

Oct. 1, 2009   (DE) .................. 10 2009 047 967

(51) Int. Cl.
*H05K 5/00*  (2006.01)
*H05K 7/00*  (2006.01)
*G06F 1/16*  (2006.01)

(52) U.S. Cl.
USPC ............ 361/679.48; 361/679.33; 361/679.49; 361/679.5; 361/679.51; 361/679.6

(58) Field of Classification Search
USPC ............... 361/679.33, 679.48, 679.49, 679.5, 361/679.51, 679.6
See application file for complete search history.

(56) References Cited

U.S. PATENT DOCUMENTS

| 5,694,294 | A | | 12/1997 | Ohashi et al. |
| 5,701,231 | A | * | 12/1997 | Do et al. ................... 361/679.48 |
| 5,784,252 | A | * | 7/1998 | Villa et al. ................ 361/679.58 |
| 6,005,770 | A | | 12/1999 | Schmitt et al. |
| 6,522,547 | B1 | * | 2/2003 | Diaz et al. ..................... 361/724 |
| 6,597,569 | B1 | * | 7/2003 | Unrein .......................... 361/679.4 |
| 7,106,581 | B2 | * | 9/2006 | Olson et al. .............. 361/679.48 |

FOREIGN PATENT DOCUMENTS

| DE | 197 42 373 A1 | 4/1999 |
| DE | 102 24 274 A1 | 12/2003 |
| DE | 20 2004 001 502 U1 | 7/2004 |
| DE | 10 2005 047 773 B4 | 4/2007 |
| JP | 11-265233 A | 9/1999 |
| JP | 2001-249736 A | 9/2001 |
| JP | 2002-032148 A | 1/2002 |
| JP | 2004-295702 A | 10/2004 |
| JP | 2008-090772 A | 4/2008 |

* cited by examiner

*Primary Examiner* — Anthony Haughton
(74) *Attorney, Agent, or Firm* — DLA Piper LLP (US)

(57) ABSTRACT

A computer case includes outer panels forming an internal space sized and shaped to accommodate at least a motherboard, a plug-in card and a hard drive; and an inner panel arranged in the internal space and which physically forms a separate lower section of the internal space from an upper section of the internal space, wherein the upper section is arranged above the lower section of the internal space such that the upper section of the internal space accommodates the motherboard and the plug-in card and the lower section of the internal space accommodates the hard drive.

8 Claims, 2 Drawing Sheets

COMPUTER CASES AND COMPUTERS

RELATED APPLICATION

This application claims priority of German Patent Application No. 10 2009 047 967.8, filed Oct. 1, 2009, herein incorporated by reference.

TECHNICAL FIELD

This disclosure relates to computer cases and computers.

BACKGROUND

Computers, especially so-called "tower PCs," achieve a high waste heat load in some parts. Therefore, computers must be efficiently ventilated to dissipate the waste heat from the computer case. Further, drives located in the computer case can cause vibration and noise. The noise produced should be as faint as possible.

It could therefore be helpful to develop computer cases and computers wherein safe and efficient ventilation of the computer is possible.

SUMMARY

We provide a computer case including outer panels forming an internal space sized and shaped to accommodate at least a motherboard, a plug-in card and a hard drive; and an inner panel arranged in the internal space and which physically forms a separate lower section of the internal space from an upper section of the internal space, wherein the upper section is arranged above the lower section of the internal space such that the upper section of the internal space accommodates the motherboard and the plug-in card and the lower section of the internal space accommodates the hard drive.

We also provide a computer including the computer case, wherein the outer panels have a bottom panel which forms a base of the lower section of the internal space, and all or at least a majority of the hard drives are arranged on the bottom panel.

LIST OF REFERENCE SYMBOLS

Figure 1:
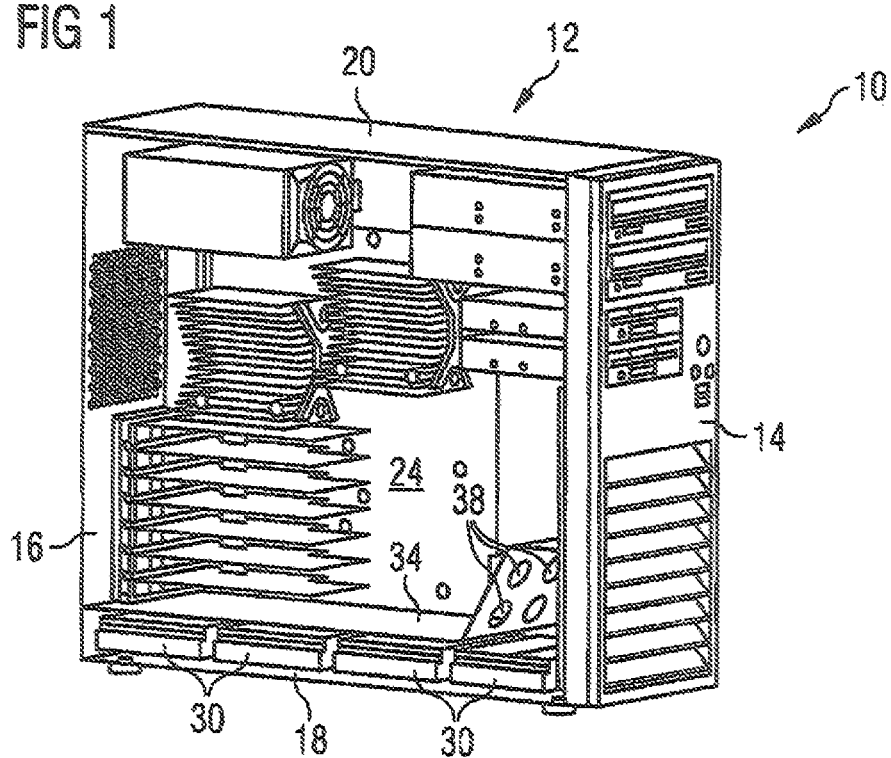
FIG. 1 shows a perspective view of a computer.

10 Computer
12 Computer case
14 Front panel
16 Rear panel
18 Bottom panel
20 Other panels
24 Internal space
24a,b Lower, upper section of internal space
26 Motherboard
28 Plug-in cards
30 Hard drive
32 Other drives
34 Inner panel
36a,b First, second fan
38 Openings in inner panel
B Width of 12
T Depth of 12

DETAILED DESCRIPTION

It will be appreciated that the following description is intended to refer to specific examples of structure selected for illustration in the drawings and is not intended to define or limit the disclosure, other than in the appended claims.

We provide computer cases which have outer panels within which an internal space is designed to accommodate a motherboard, plug-in cards, and at least one hard drive and have an inner panel arranged in the internal space. The inner panel is designed to physically separate a lower section of the internal space from an upper section of the internal space. The upper section may be arranged above the lower section of the internal space. The upper section of the internal space is designed to accommodate the motherboard and the plug-in cards and the lower section of the internal space is designed to accommodate the hard drives.

This has the advantage that the waste heat of hard drives can be restricted to the separate, lower section of the internal space. Thus, loading the motherboard and the plug-in cards with the waste heat of the hard drives can be avoided. The hard drives can be arranged in a low-set area of the internal space. Thus, a low center of gravity of the computer is possible. Natural oscillations or vibrations of the computer case can be very small. Further, the computer case can be designed with panels having small wall thickness. In this way, a low cost, low weight computer case can be achieved.

Preferably, the computer case has a first fan designed to produce an air flow in the upper section of the internal space and has a second fan. The second fan is arranged in one of the outer panels or in the lower section of the internal space and produces an air flow in the lower section of the internal space. This facilitates the waste heat of the hard drives to be dissipated separately from the lower section of the internal space by the second fan independent of the first fan without having to thermally load other components located in the internal space.

Preferably, the computer case has a rectangular-block-shaped design. The lower section of the internal space stretches over an entire width and/or an entire depth of the computer case. This has the advantage that a good distribution of the hard drives across the area of the lower section of the internal space is possible.

Preferably, there are openings in the inner panel designed for the ventilation coupling of the lower section of the internal space with the upper section of the internal space. This has the advantage that an air flow from the upper to the lower section of the internal space can be achieved by the fan. Thus, a removal of the waste heat from the entire internal space of the case (with the motherboard and the plug-in cards) can be achieved by the fan.

We also provide computers with computer cases. The outer panels have a bottom panel which forms the base for the lower section of the internal space. All or at least a majority of the hard drives are arranged on the bottom panel. In particular, the hard drives cover the bottom panel essentially completely. This has the advantage that a very low center of gravity of the computer is possible. Further, no additional elements are required to prevent tilting of the computer.

Selected representative examples are explained in detail below with the help of schematic drawings. Elements having the same construction or function are provided with the same reference symbols in all of the figures.

Figure 2:
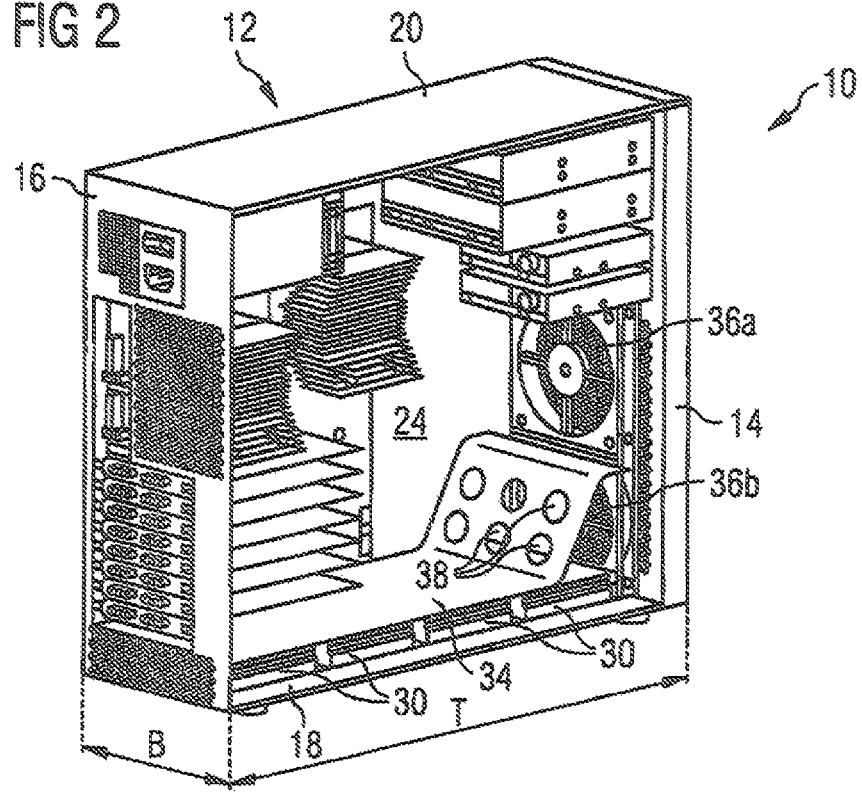
FIG. 2 shows another perspective view of the computer.
Figure 3:
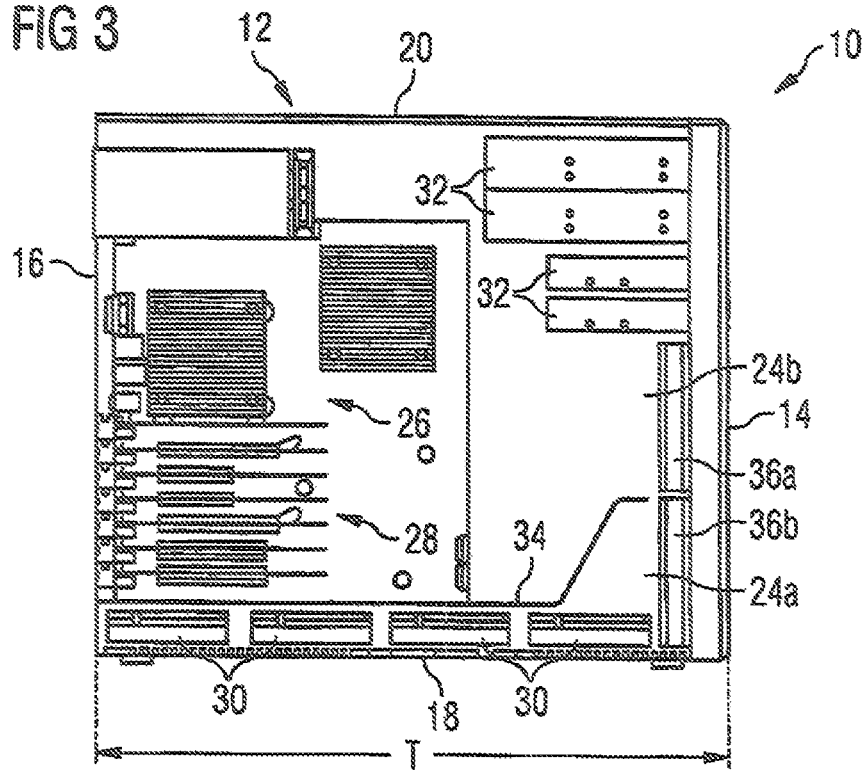
FIG. 3 shows a side view of the computer.

FIGS. 1-3 show a first example of a computer 10. The computer 10 is especially designed as a tower PC. The computer 10 has a computer case 12 which has a rectangular-block-shaped design.

The computer case 12 has a front panel 14, a rear panel 16, a bottom panel 18 and other panels 20 which together form the outer panels. The other panels 20 can be, for example, a cover panel and side panels.

The panels 14, 16, 18, 20 can be made especially from a metal sheet, preferably a steel sheet, or can have a steel sheet.

An internal space 24 is designed within the outer panels 14, 16, 18, 20. A motherboard 26 with a microprocessor and several plug-in cards 28 are arranged in the internal space 24.

Other hard drives 30 are arranged in the internal space 24.

Moreover, other drives 32 are inserted in the openings of the front panel 14. The drives 32 may especially be 3½" drives and 5¼" drives, for example.

An inner panel 34 is arranged in the internal space 24, wherein this inner panel stretches substantially over an entire width B and an entire depth T of the computer case 12. The inner panel 34 separates a lower section 24a of the internal space 24 from an upper section 24b of the internal space 24. The upper section 24b of the internal space 24 is arranged above the lower section 24a of the internal space 24.

The motherboard 26 with the microprocessor and the plug-in cards 28 are arranged in the upper section 24b of the internal space 24. The hard drives 30 are arranged in the lower section 24a of the internal space 24. This means that the inner panel 34 partitions the internal space 24 in such a way that the lower section 24a of the internal space 24 is designed as a channel which stretches over the entire width B and the entire depth T of the computer case 12; the hard drives 30 are accommodated in the channel. Other components of the computer 10 are not arranged and accommodated in the lower section 24a of the internal space 24.

Fans 36a, 36b are arranged in the front panel 14. A first fan 36a and a second fan 36b are especially arranged in the front panel 14 in the embodiment of the computer case 12 shown in FIGS. 1-3. The two fans 36a, 36b are especially arranged one above the other. The first fan 36a is dedicated to the upper section 24b of the internal space 24 and can cause an air flow in the upper section 24b of the internal space 24, wherein waste heat from the motherboard 26 with the microprocessor and from the plug-in cards 28 can be dissipated by this air flow.

The second fan 36b is arranged below the first fan 36a and dedicated to the lower section 24a of the internal space 24. An air flow can be produced with the lower, second fan 36b in the lower section 24a of the internal space 24, with the hard drives 30 being arranged in this lower section, wherein waste heat from the hard drives 30 can be dissipated to the environment by this air flow.

Through the design of the lower section 24a of the internal space 24, it can be achieved, by the inner panel 34, that the waste heat accumulating on the hard drives 30 can remain in a limited area of the internal space 24 and does not reach the upper section 24b of the internal space 24. Thus, a thermal load on the motherboard 26 with the microprocessor and plug-in cards 28 due to the waste heat of the hard drives 30 can be avoided. The waste heat of the hard drives 30 can be drawn out from the lower section 24a of the internal space 24 by the lower, second fan 36b. Thus, a load on other components arranged in the internal space 24 of the computer case 12 can be kept low.

All hard drives 30 are arranged evenly on the bottom panel 18. This means that the bottom panel 18 is essentially covered by the hard drives 30. Thus, a very low center of gravity of the computer 10 can be achieved. Additional elements for preventing tilting of the computer 10 can thus be avoided.

Natural oscillations or vibrations of the computer case 12 can be kept low by the fixed arrangement of the hard drives 30 on the bottom panel 18 in the lower section 24a of the internal space 24. Moreover, the force transmission from the hard drives 30 to the computer case 12 can be kept low, so that lower stability requirements can be placed on the computer case 12. In particular, this can be achieved such that the noise production of the computer 10, especially that of the computer case 12, can be kept very low. Further, it is possible to use simple feet instead of expensive feet for setting up the computer case 12.

The wall thicknesses of the outer panels 14, 16, 18, 20 can be reduced on account of the low mechanical load of the computer case 12, so that a reduction in weight of the computer case 12 is possible. For the outer panels 14, 16, 18, 20, it is also possible to use sheets with a sheet thickness of about 0.6 to about 0.8 mm instead of sheets with the usual sheet thickness of about 1.2 mm for the outer panels 14, 16, 18, 20.

The inner panel 34 has openings 38 which facilitate a ventilation coupling of the lower section 24a of the internal space 24 with the upper section 24b of the internal space 24. Thus, it is possible that even the lower, second fan 36b which ventilates the lower section 24a of the internal space 24 can contribute towards ventilation of the upper section 24b of the internal space 24. Hence, even the lower, second fan 36b can contribute towards a dissipation of the waste heat from the motherboard 26 with the microprocessor and the plug-in cards 28.

Figure 4:
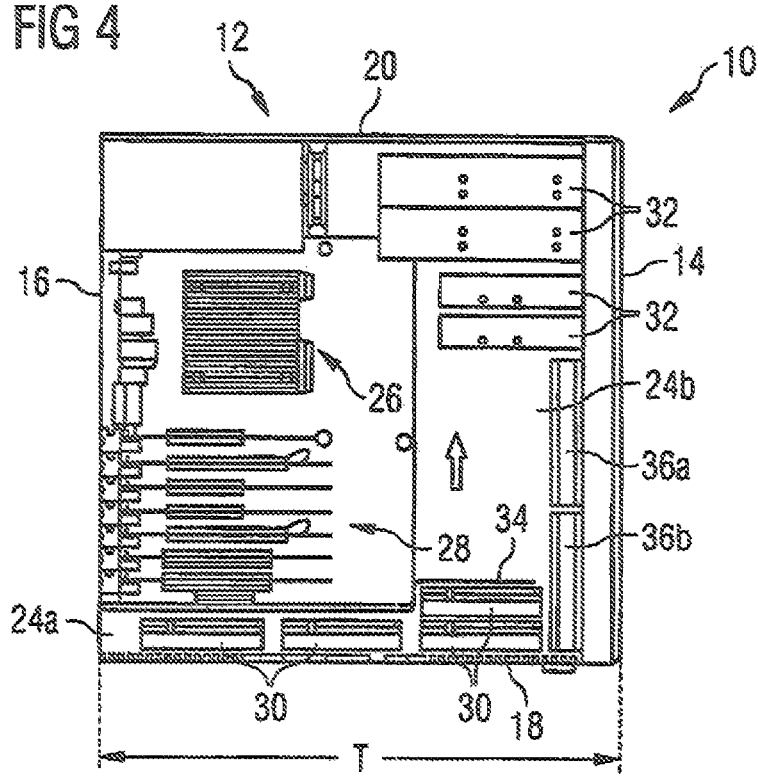
FIG. 4 shows a perspective view of another computer.

Another example of the computer 10 is shown in FIG. 4 with a reduced depth T of the computer case 12 when compared with the example of FIGS. 1-3.

In this example, the hard drives 30 are arranged in their majority on the bottom panel 18 of the computer case 12. One of the hard drives 30 is arranged on top of another of the hard drives 30 due to minimal depth T of the computer case 12. Basically, however, even in this example, the majority of the hard drives 30 is arranged on the bottom panel 18. Thus, a low center of gravity of the computer 10 can be achieved, and additional elements for preventing tilting of the computer 10 can be avoided.

Although the apparatus has been described in connection with specific forms thereof, it will be appreciated that a wide variety of equivalents may be substituted for the specified elements described herein without departing from the spirit and scope of this disclosure as described in the appended claims.

The invention claimed is:

1. A computer case comprising:
   outer panels forming an internal space sized and shaped to accommodate at least a mother board, a plug-in card and a hard drive;
   an inner panel arranged in the internal space and which physically forms a separate lower section of the internal space from an upper section of the internal space, wherein the upper section is arranged above the lower section of the internal space such that the upper section of the internal space accommodates the motherboard and the plug-in card and the lower section of the internal space accommodates the hard drive;
   a first fan that produces an air flow in the upper section of the internal space; and
   a second fan that produces an air flow in the lower section of the internal space, wherein the second fan cools the hard drive and separately dissipates waste heat of the hard drive in the lower section independent of the first fan without having to thermally load other components located in the upper section of the internal space.

2. The computer case according to claim 1, having a substantially rectangular-block-shaped design, and the lower section of the internal space substantially stretches over an entire width (B) and/or an entire depth (T) of the computer case.

3. The computer case according to claim 1, further comprising at least one opening arranged in the inner panel for ventilation coupling of the lower section of the internal space with the upper section of the internal space.

4. The computer case according to claim 2, further comprising at least one opening arranged in the inner panel for ventilation coupling of the lower section of the internal space with the upper section of the internal space.

5. A computer comprising a computer case according to claim 1, wherein the outer panels have a bottom panel which forms a base of the lower section of the internal space, and all or at least a majority of the hard drives are arranged on the bottom panel.

6. The computer case according to claim 1, wherein the second fan is arranged in one of the outer panels or in the lower section of the internal space.

7. A computer case comprising;
   outer panels forming an internal space sized and shaped to accommodate at least a motherboard, a plug-in card and a hard drive;
   an inner panel arranged in the internal space and which physically forms a separate lower section of the internal space from an upper section of the internal space; wherein
     the upper section is arranged above the lower section of the internal space;
     the lower section is a channel stretching over the entire width and entire depth of the computer case;
     the upper section of the internal space accommodates the motherboard and the plug-in card; and
     the lower section of the internal space accommodates the hard drive;
   a first fan that produces an air flow in the upper section of the internal space, wherein waste heat of the motherboard and the plug-in card is dissipated by the airflow of the first fan; and
   a second fan that produces an airflow in the lower section of the internal space, wherein the second fan cools the hard drive and separately dissipates waste heat of the hard drive in the lower section independent of the first fan and wherein the waste heat of the hard drive does not reach the upper section and does not thermally load other components located in the internal space.

8. A computer case comprising:
   outer panels forming an internal space sized and shaped to accommodate at least a motherboard, a plug-in card and a hard drive;
   an inner panel arranged in the internal space and which physically forms a separate lower section of the internal space from an upper section of the internal space, wherein
     the upper section is arranged above the lower section of the internal space;
     the upper section of the internal space accommodates the motherboard and the plug-in card; and
     the lower section of the internal space accommodates the hard drive;
   a first fan that produces a first airflow that dissipates waste heat of the motherboard and the plug-in card to the environment in the upper section of the internal space, wherein the first fan is arranged in an area of a first opening of an outer wall of the computer case, and the first opening is arranged in the upper section of the internal space; and
   a second fan that produces a second airflow that dissipates waste heat of the hard drive to the environment in the lower section of the internal space, wherein
     the second fan is arranged in an area of a second opening of an outer wall of the computer case, and the second opening is arranged in the lower section of the internal space;
     the second airflow is independent of the first airflow; and
     the second airflow dissipates the waste heat of the hard drive such that the waste heat of the hard drive does not thermally load other components located in the internal space.

* * * * *